(12) United States Patent  
Salvador et al.

(10) Patent No.: US 7,926,686 B2
(45) Date of Patent: Apr. 19, 2011

(54) ROOF RACK CROSS BAR RISE UP FEATURE

(75) Inventors: Christopher Salvador, Delaware, OH (US); Josh Morrow, Dublin, OH (US); Dave Sunderhaus, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 831 days.

(21) Appl. No.: 11/937,180

(22) Filed: Nov. 8, 2007

(65) Prior Publication Data

US 2008/0252100 A1  Oct. 16, 2008

Related U.S. Application Data

(60) Provisional application No. 60/866,962, filed on Nov. 22, 2006.

(51) Int. Cl.
*B60R 9/045* (2006.01)
(52) U.S. Cl. .................. 224/321; 224/322; 224/325
(58) Field of Classification Search .............. 224/309, 224/310, 321, 325, 326
See application file for complete search history.

(56) References Cited

U.S. PATENT DOCUMENTS

| 5,377,890 | A | 1/1995 | Brunner et al. |
| 5,511,709 | A * | 4/1996 | Fisch ........................... 224/321 |
| 5,577,649 | A * | 11/1996 | Lee et al. ...................... 224/321 |
| 6,286,739 | B1 | 9/2001 | Stapleton |
| 6,409,063 | B1 | 6/2002 | Kmita et al. |
| 6,415,970 | B1 * | 7/2002 | Kmita et al. .................. 224/326 |
| 6,811,066 | B2 | 11/2004 | Aftanas et al. |
| 6,959,845 | B2 | 11/2005 | Aftanas et al. |
| 2008/0308590 | A1 * | 12/2008 | Aftanas et al. ............... 224/330 |

* cited by examiner

*Primary Examiner* — Justin M Larson
*Assistant Examiner* — Adam Waggenspack
(74) *Attorney, Agent, or Firm* — Mark E. Duell; Rankin Hill & Clark LLP

(57) ABSTRACT

A roof rack having movable cross bars that have a low profile when aligned with the side bars, but are raised when generally perpendicular to the side bars. The height variation is achieved using ribs that are provided on a bottom side of the cross bars. When the cross bars are aligned with the side bars, the ribs fit into slots that are provided in the side bars. As a result, each cross bar has a very low profile with respect to the roof of the vehicle. When each cross bar is rotated to a position generally perpendicular to the side bars, the ribs within the cross bar are no longer aligned with the slots in the side bar. Instead, the ribs rest on an upper surface of the side bar, and thus, provide a significant gap between the cross bar and vehicle roof.

10 Claims, 4 Drawing Sheets

ROOF RACK CROSS BAR RISE UP FEATURE

BACKGROUND OF THE INVENTION

1. Field of the Invention

The invention is directed to automobile subassemblies or accessories, namely racks placed on the roof of the automobile for securing belongings.

2. Description of Related Art

Roof racks have been used for years on vehicles to simplify the storage of belongings, including sporting goods, suitcases, and carrying containers. Typical roof racks include a series of side bars that run along the length of the vehicle and cross bars that run across the width of the vehicle. The side bars and cross bars provide support for the belongings being carried and provide points of attachment for ropes and cords used to secure the belongings.

To increase vehicle aerodynamics and aesthetics, roof racks have been developed that include cross bars that can be rotated between a first position (typically a position of non-use) that is parallel to the side bars and a second position (typically a use position) that is perpendicular to the side bars. However, within these systems, the height of the cross bars above the vehicle roof does not change when the cross bar is rotated from the first position to the second position. As a result aerodynamics and aesthetics are not maximized.

What is desired is a roof rack system with rotatable cross bars wherein when the cross bars are in a stored position, the cross bars have an extremely low profile, and when the cross bars are in a use position, the cross bars are raised and a required minimum clearance is provided between the cross bar and the vehicle roof.

BRIEF SUMMARY OF THE INVENTION

The present invention overcomes deficiencies in the art by providing a roof rack having movable cross bars that have a low profile when aligned with the side bars, but are raised when in a position generally perpendicular to the side bars. The height variation is achieved using ribs that are provided on a bottom side of the cross bars. When the cross bars are aligned with the side bars, the ribs fit into slots that are provided in the side bars. As a result, each cross bar has a very low profile with respect to the roof of the vehicle in this storage position. When each cross bar is rotated or otherwise moved to a position generally perpendicular to the side bars, the ribs within the cross bar are no longer aligned with the slots in the side bar. Instead, the ribs rest on an upper surface of the side bar, and thus, create a significant gap between the cross bar and vehicle roof.

Additionally, the roof rack is provided with a plurality of pivot pin/locking mechanisms that lock the cross bar to the side bar when the cross bar is aligned with the side bar. By simply rotating two pivot pin/locking mechanisms until a key on the pivot pin/locking mechanism is no longer in a locking position, but instead a restraining position (aligned with a post on the underside of the side bar) the cross bar can be lifted. By additionally, or alternatively, rotating the pivot pin/locking mechanism until the key is aligned with an aperture protrusion on the side bar, the cross bar, no longer being restrained, can be lifted further such that one or both ends of the cross bar becomes freely removable from the side bar. Typically, one end of each cross bar is removed from the side bar while the second end is unlocked, but kept in a restrained position (key not aligned with protrusion or post) and the first end rotated with the opposite end remaining in contact with the side bar and acts as a pivot point. The pivot pin/locking mechanism on the removed end is then inserted into the vacant spot on the opposite side bar after the second cross bar has been released in a similar manner. After insertion, the pivot pin/locking mechanism is again rotated moving the key to the restrained position, thus, securing the cross bar in a use position.

These and other aspects of the invention are herein described in particularized detail with reference to the accompanying figures.

DETAILED DESCRIPTION OF THE INVENTION

Figure 1:
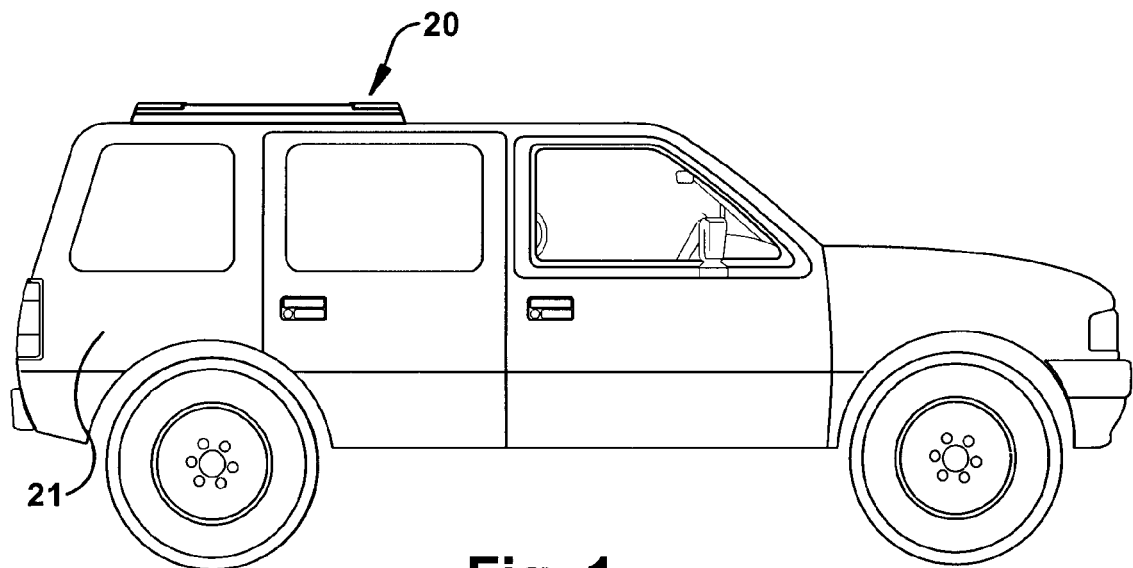
FIG. 1 is a side elevational view of a vehicle including a roof rack of the present invention.
Figure 2:
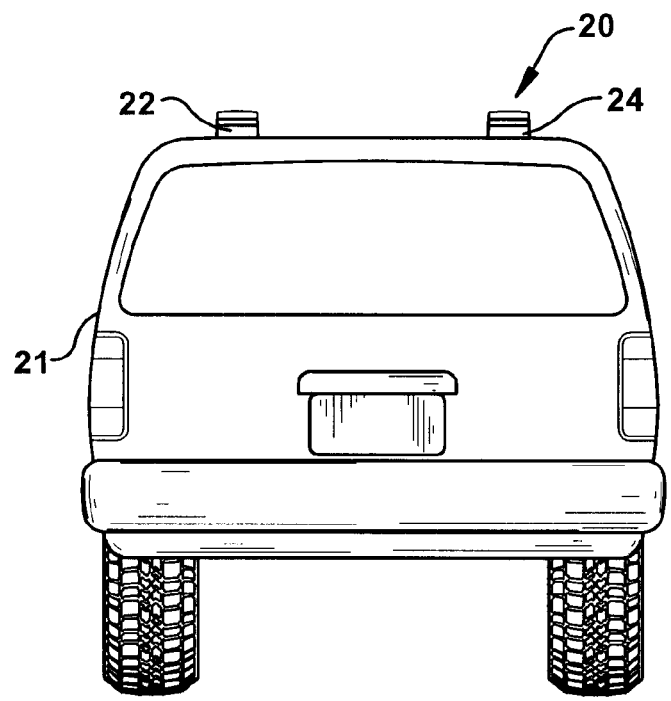
FIG. 2 is a rear elevational view of the vehicle showing the roof rack in a storage position.

Referring to the drawings, specifically FIGS. 1-4, a preferred roof rack storage system 20 according to the present invention is illustrated on a vehicle 21. The roof rack system 20 includes first and second side bars 22 and 24, first and second cross bars 26 and 28 and four pivot pin/locking mechanisms 30. The cross bars 26 and 28 are rotatable between a storage position that is in line with the side bars 22 and 24 and a use position generally perpendicular to the side bars 22 and 24. As described in more detail below, the cross bars 26 and 28 can be locked in either position. The invention will be described below, often with regard to only one side bar 22 and one cross bar 26. However, the second side bar 24 has the same structure as the first side bar 22 and the second cross bar 28, the same structure as the first cross bar 26.

Figure 3:
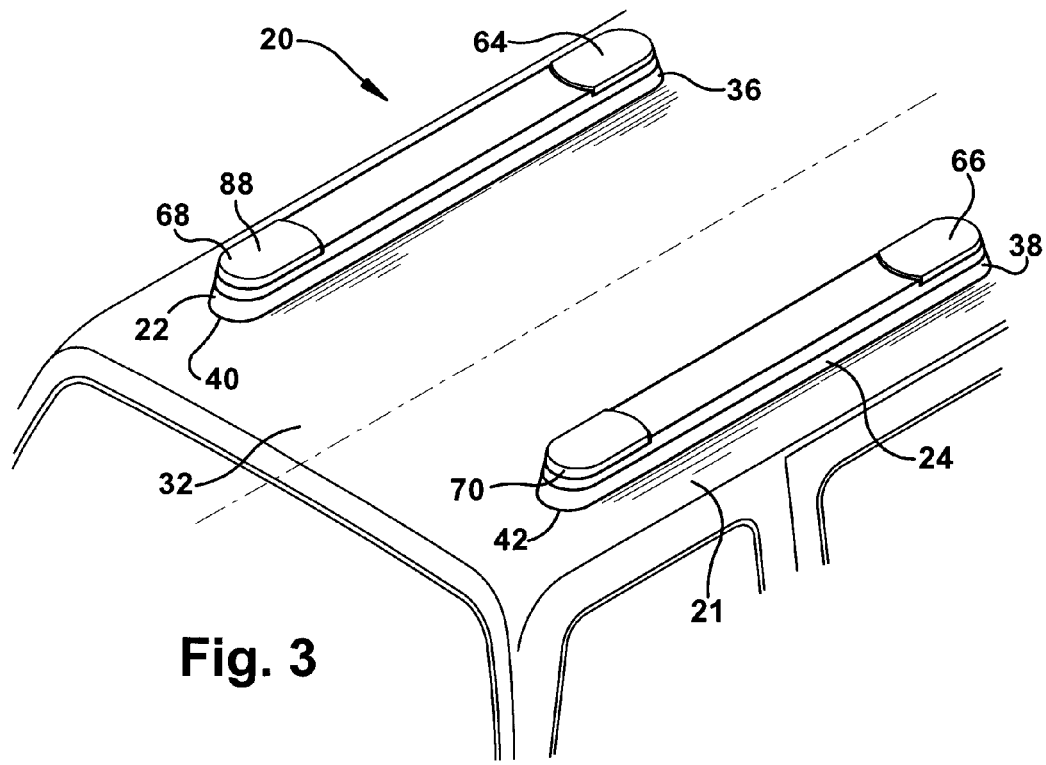
FIG. 3 is a perspective view of the vehicle roof showing the roof rack in a storage position.
Figure 4:
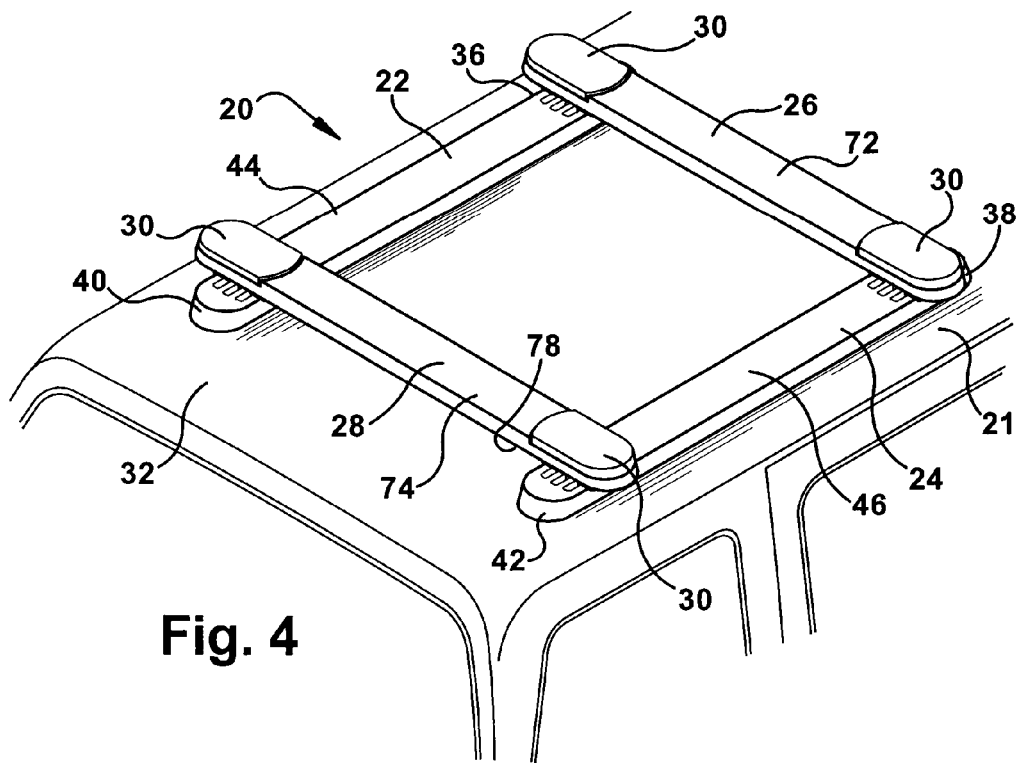
FIG. 4 is a perspective view of the vehicle roof showing the roof rack in a use position.
Figure 5:
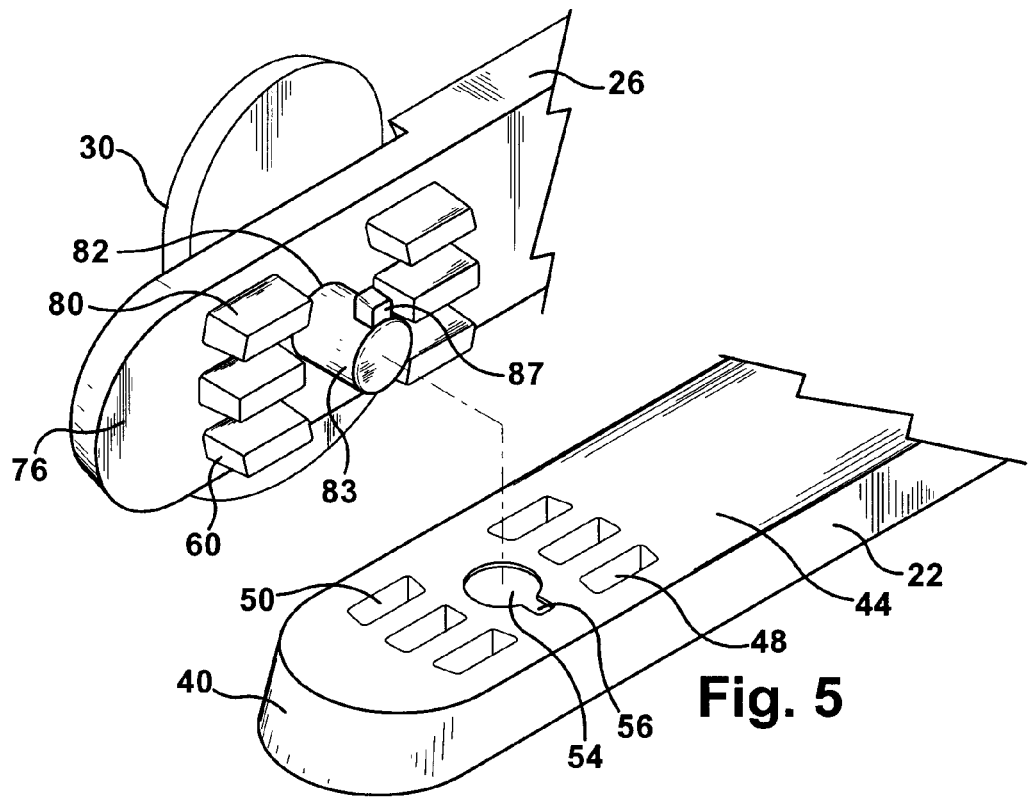
FIG. 5 is an exploded view of a portion of the roof rack showing a cross bar detached from a side bar.
Figures 6, 7:
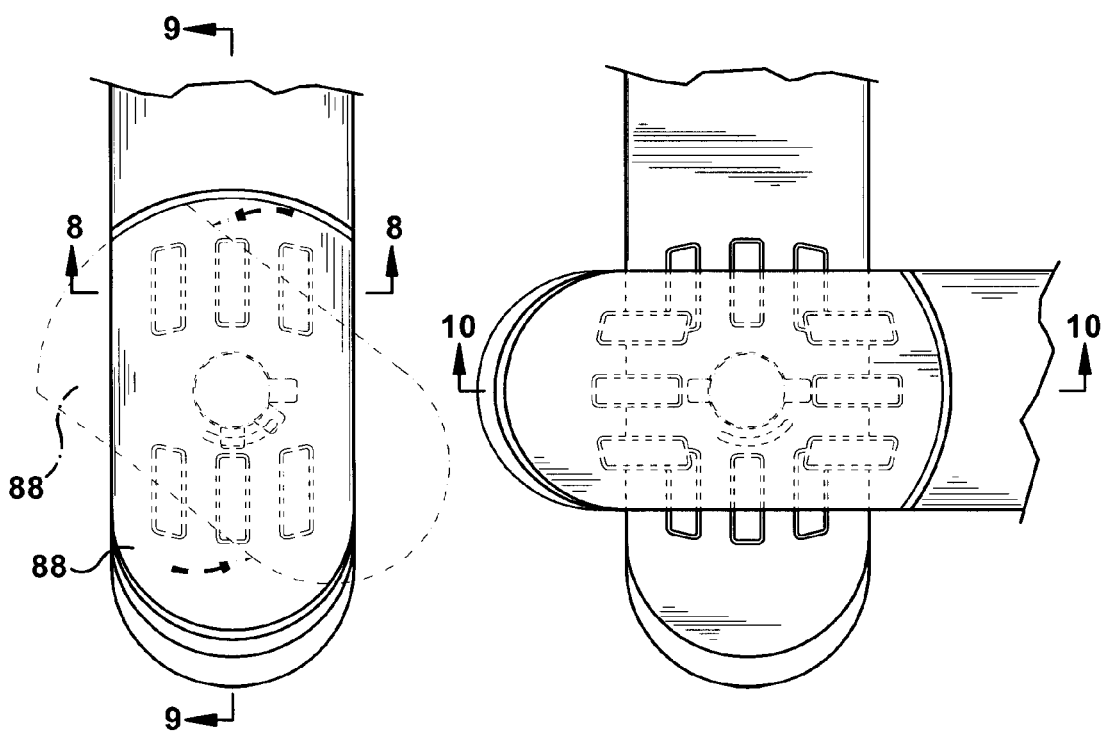
FIG. 6 is top view of a portion of the roof rack showing the pivot pin/locking mechanism moving from a locked position to an unlocked, restrained, position.
FIG. 7 is a top view of a portion of the roof rack showing the cross bar in a rotated use position.
Figure 8:
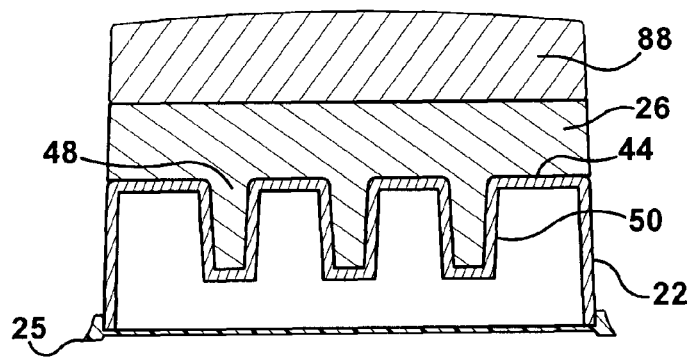
FIG. 8 is a cross-sectional view of a portion of the roof rack showing the cross bar in a storage position.

Referring to FIGS. 3, 4 and 8 the first side bar 22 and second side bar 24 extend lengthwise along the vehicle roof 32. A gasket 25 is placed between each side bar 22 and 24 and the roof 32 to prevent damage to an outside surface of the roof 32. The first side bar 22 has a forward end 36, a rearward end 40 and a top surface 44. The second side bar 24 has a forward end 38, a rearward end 42 and a top surface 46. Referring to FIGS. 5 and 8, slots 48 are shown at the rearward end 40 of the first side bar 22. In a similar manner, slots 48 are provided in the forward end 36 of the first side bar 22 and the forward and rearward ends, 38 and 42, of the second side bar 24. Preferably, the side bar 22 is hollow and includes enclosed pockets 50 beneath the slots 48 in the top surface 44. Six slots 48 are provided and each has a rectangular shape. The slots 48 are arranged in two rows of three slots across the width of the side bar 22. The slots 48 are oriented lengthwise along the length of the side bar 22. The sides of the pocket 50 taper inwardly, becoming smaller, as the pocket 50 extends downwardly.

Figure 9:
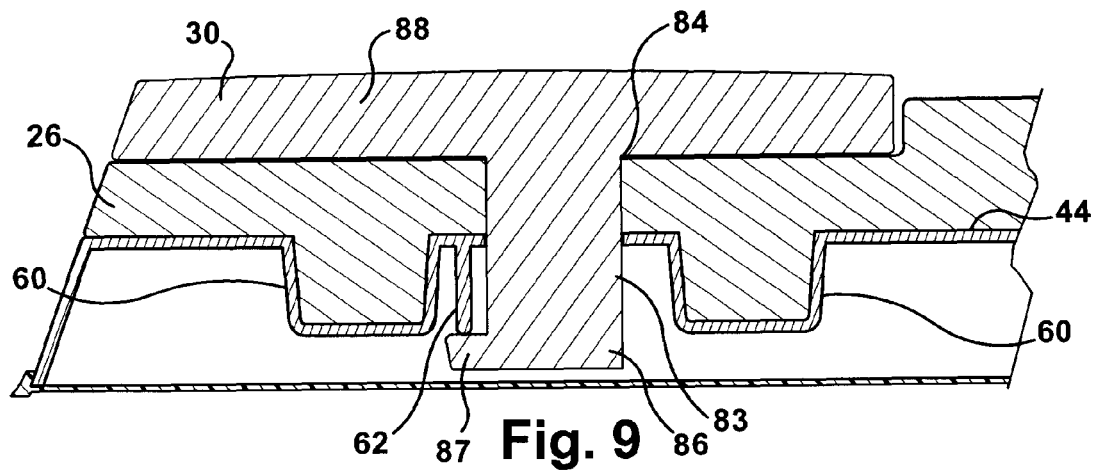
FIG. 9 is a cross-sectional view of a portion of the roof rack showing the pivot pin/locking mechanism in a locked position.

An aperture 54 is located between the two rows of slots 48 on each end of each side bar 20 and 22. The aperture 54 preferably has a keyhole shape. The protruding portion 56 of the keyhole shaped aperture points toward a lengthwise center line running along the vehicle roof 32. Preferably, the side bars 22 and 24 are rounded at each end to provide an aesthetic appearance. Referring to FIGS. 8 and 9, below the upper surface 44 of the side bar 22, the pockets 50 extend downwardly, approximately two thirds of the thickness of the side bar 22. A locking post 62 is provided adjacent to the pockets 50 and also extends downwardly from the top of the side bar 22. The depth of the locking post 62 is approximately equal to the depth of a pocket 50.

Referring back to FIGS. 3-5, each cross bar 26 and 28 is a long straight bar of solid material. Each cross bar 26 and 28 has, respectively, a forward end 64 and 66 and a rearward end 68 and 70 as defined when the length of the cross bar 26 and 28 is aligned with the length of the vehicle 21. The thickness of the cross bar 26 is generally consistent except at the forward end 64 and rearward end 68. At each end, the thickness is reduced such that a top surface 72 and 74 of each cross bar 26 and 28 is not flat, but instead includes a single step downward. A bottom surface 76 of each cross bar is flat except for a plurality of ribs 60 that protrude therefrom at each end. Preferably six rectangular ribs 60 protrude in two rows of three ribs each. The pattern of ribs 60 matches the pattern of slots 48 within an adjacent side bar when the side bar 22 and cross bar 26 are aligned. A circular aperture 82 is defined in each cross bar 26 and 28 between the two rows of rectangular ribs 60. Preferably, the length and width of each rib 60 narrows slightly as the rib 60 extends away from the bottom surface 76 of the cross bar 26.

Referring to FIGS. 5 and 9, the pivot pin/locking mechanism 30 is shown. The pivot pin/locking mechanism 30 includes a pivot pin 83 having a first end 84 and a second end 86. The pin 83 passes through the hole 82 in the cross bar. A small rectangular key 87 protrudes radially from the second end 86 of the pin 83. A handle 88 is affixed to or integrally formed with the first end 84 of the pin 83. The handle 88 preferably has an oval shape that fills the stepped end of the cross bar 26 when the handle 88 is aligned length wise with the length of the cross bar 26. The curves of the handle 88 match the curves within the stepped end of the cross bar 26.

Referring to FIGS. 3-5, the side bars 22 and 24 are affixed to the roof 32 of a vehicle 21. The cross bars 26 and 28 are supported by the side bars 22 and 24. When a side bar 22 is aligned with a cross bar 26, the cross bar 26 fully covers the top surface 44 of the side bar 22. Additionally, the ribs 60 within the crossbar 26 fit into the slots 48 within the side bar 22. As a result, the cross bar 26 has a low profile when viewed from the side of the vehicle.

When a side bar 22 is aligned with a cross bar 26 and the ribs 60 within the slots 50, the cross bar 26 may be locked in position. The handle 88 is rotated into a locking position wherein the handle is aligned with the length of the cross bar 26 and side bar 22, such that referring to FIG. 9, the key 87 of the locking pivot pin/locking mechanism 30 is trapped beneath the post 62. Thus, the cross bar 26 is prevented from being lifted until the handle 88 is again rotated and the cross bar 26 unlocked. The cross bar 26 cannot be rotated without first lifting the cross bar 26 because the ribs 60 and pockets 50 will interfere with each other. Referring to FIG. 8, the cross bar 26 is also shown in a locked configuration.

Referring to FIGS. 5, 6, 7, 9 and 10, a preferred method of unlocking the pivot pin/locking mechanism 30 and rotating the cross bar 26 is shown. In no particular order, the four handles 88 of the roof rack system 20 are rotated. The handles 88 are rotated, in this case counter clockwise, but may be rotated in either direction. This rotation moves the key 87 out of alignment with the post 62 and allows the cross bar 26 to be lifted. The cross bar 26 is lifted until the ribs 60 within the cross bar exit the pockets 50 within the side bar 22. If the key 67 is not aligned with the protrusion 56 of the aperture 54 in the side bar, the pivot pin/locking mechanism is in a restrained position.

Additionally, one handle 88 in each cross bar 26 is further rotated, either before or after the cross bar 26 is first lifted, such that the key 87 on the pivot pin 82 is aligned with the protrusion 56 in the aperture 54. If the handle 88 at the forward end 64 of the first cross bar 26 is rotated to this position, the handle 88 at the rearward end 70 of the second cross bar 28 is also rotated to this position. Alternatively, if the handle 88 at the rearward end 68 of the first cross bar 26 is rotated to this unlocked position, the handle 88 at the forward end 66 of the second cross bar 28 is also rotated to this position. The cross bar 26 is then lifted, at this end, up and out of contact with the side bar 22. On the opposite end of the cross bar, where the key and protrusion are not aligned and the pivot point/locking mechanism remains in the restrained position, upward movement of the cross bar 26 is limited by the key 87 butting up against the side bar 22.

Figure 10:
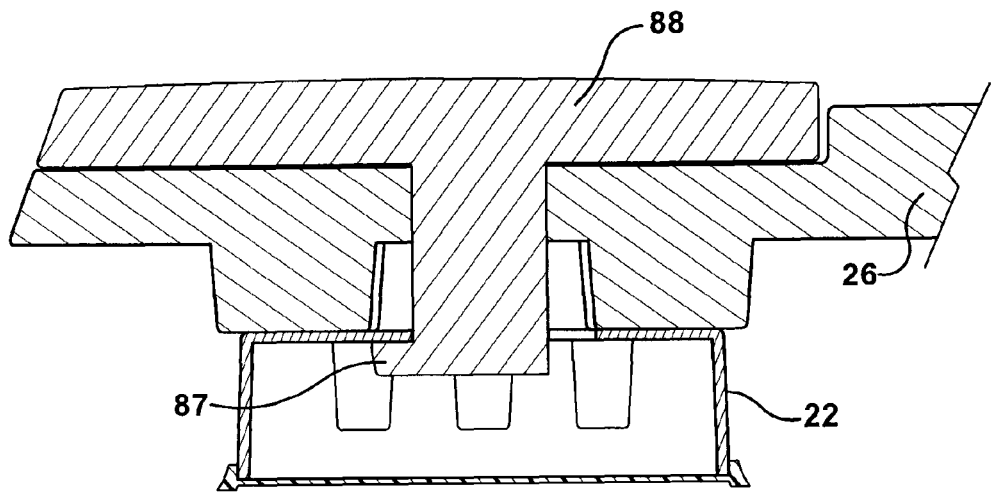
FIG. 10 is a cross-sectional view of a portion of the roof rack showing the pivot pin/locking mechanism in a restrained position.

The cross bars 26 and 28 are then rotated until the cross bars 26 and 28 are oriented generally perpendicular to the side bars 22 and 24. The handle 88, at the end of the cross bar that was rotated is then moved until the key 67 is aligned with the protrusion of the aperture on the side bar and the key 67 is inserted into the aperture. The handle 88 is then rotated such that the key 67 is moved back to a restraining position, as shown in FIG. 10. The cross bars 26 and 28 are now in a use position. The process is reversed in order to place the cross bars back into a storage position.

The pivot pin/locking mechanism 30 may simply act as a locking mechanism. In this manner, to change from a storage configuration to a use configuration, all handles 88 are turned to the unlocked position such that the key 67 on the pin 82 is aligned with the protrusion 56 on the aperture 54 in the side bar 22. Both cross bars 26 and 28 are then simply lifted off of the side bars 22 and 24 (as illustrated in FIG. 5). The cross bars 26 and 28 are then placed across the side bars perpendicularly after the handles 88 are rotated such that the keys 67 are aligned with the protrusions 56 in the apertures 54. After the cross bars 26 and 28 are in place, the handles 88 are further rotated so the key 67 moves away from the protrusion 56 and into a retaining position, thus, the cross bar 26 is secured to the side bar 22.

More than two side bars may be used in the roof rack. Additional side bars are placed between the first and second side bars. The cross bars do not lock into the additional sidebars, but may be supported by the additional side bars. Preferably, the slots are pockets formed in a hollow side bar. Alternatively, the slots are simple apertures cut into the top of a hollow bar. The slots are shown having a rectangular shape, but may be any shape such as square or oval. The protruding portion of the keyhole shaped aperture may point in any direction, not just toward the lengthwise center line of the vehicle roof. The roof rack may be provided as original equipment on the vehicle or as an after-market accessory.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A vehicle roof storage rack comprising:

first and second side bars for running lengthwise along the vehicle roof, each side bar including a forward end and a rearward end and a top surface, wherein a plurality of slots and an aperture are defined by the top surface at both the first end and the second end of each side bar;

first and second rotatable cross bars, each cross bar including a forward end and a rearward end and a bottom surface, wherein a plurality of ribs protrude from the bottom surface at both the forward end and the rearward end of each cross bar;

a pivot pin placed at each end of the first and second cross bars for selectively securing an end of a cross bar to an end of a side bar;

whereby to move the first and second cross bars from a storage position to a use position the pivot pin on the forward or rearward end of the first cross bar is moved from a first locking position to an unlocked position and the pivot pin on the alternate end of the second cross bar is moved from a first locking position to a restraining position wherein the ribs can be moved out of the slots and the cross bars are rotated into a use position where the ribs rest on the top surface of the side bars and where the pivot pin that were moved to an unlocked position are placed into the opposite side bar from which the pivot pin was removed and moved into a restraining position.

2. The vehicle roof storage rack of claim 1, wherein the slots defined by the top surface are the tops of pockets defined by the side bars.

3. The vehicle roof storage rack of claim 2, wherein the pivot pin has a handle at the top of the pivot pin and a key at the bottom of the pivot pin.

4. The vehicle roof storage rack of claim 3, wherein the top surface aperture has a keyhole shape.

5. The vehicle roof storage rack of claim 1 wherein the first cross bar and second cross bar each further comprise a first seat and a second seat.

6. The vehicle roof storage rack of claim 1, wherein the slots are rectangular and the ribs are rectangular.

7. The vehicle roof storage rack of claim 3, wherein the first and second side bars both further comprise a post for interacting with the key of the pivot pin.

8. The vehicle storage rack of claim 3, wherein the handle is configured on the top of the cross bar.

9. The vehicle storage rack of claim 1, wherein when the first side bar is aligned with the first cross bar, the first cross bar fully covers the top surface of the first side bar.

10. A method of reconfiguring a roof rack storage system from a storage position to a use position comprising the steps of:

providing a roof rack storage system including:

first and second side bars for running lengthwise along the vehicle roof, each side bar including a forward end and a rearward end and a top surface, wherein a plurality of slots and an aperture are defined by the top surface at both the first end and the second end of each side bar;

first and second rotatable cross bars, each cross bar including a forward end and a rearward end and a bottom surface, wherein a plurality of ribs protrude from the bottom surface at both the forward end and the rearward end of each cross bar;

a pivot pin placed at each end of the first and second cross bars for selectively securing an end of a cross bar to an end of a side bar;

unlocking the pivot pins at a first end of the first cross bar and the second end of the second cross bar;

moving the pivot pins at a second end of the first cross bar and the first end of the second cross bar from a first locked position to a restrained position; moving the ribs out of the slots to allow the cross bars to rotate into a use position where the ribs rest on the top surface of their respective side bars;

rotating the first and second cross bars into a perpendicular orientation with respect to the side bars; and placing all of the pivot pins not already in a restrained position into a restrained position.

* * * * *